US012654721B2

(12) United States Patent  
Rathour et al.

(10) Patent No.: US 12,654,721 B2  
(45) Date of Patent: Jun. 16, 2026

---

(54) IN-VEHICLE COMPUTER SYSTEM AND AUTONOMOUS DRIVING ASSISTANCE SYSTEM

(71) Applicant: Hitachi Astemo, Ltd., Hitachinaka (JP)

(72) Inventors: Swarn Singh Rathour, Tokyo (JP); Tasuku Ishigooka, Tokyo (JP); Satoshi Otsuka, Tokyo (JP); Hideyuki Sakamoto, Tokyo (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 91 days.

(21) Appl. No.: 18/272,734

(22) PCT Filed: Sep. 14, 2021

(86) PCT No.: PCT/JP2021/033760  
§ 371 (c)(1),  
(2) Date: Jul. 17, 2023

(87) PCT Pub. No.: WO2022/172498  
PCT Pub. Date: Aug. 18, 2022

(65) Prior Publication Data  
US 2024/0300501 A1     Sep. 12, 2024

(30) Foreign Application Priority Data  
Feb. 15, 2021     (JP) ................................. 2021-021914

(51) Int. Cl.  
*G06F 8/65* (2018.01)  
*B60R 16/023* (2006.01)  
*B60W 50/023* (2012.01)

(52) U.S. Cl.  
CPC ....... *B60W 50/023* (2013.01); *B60R 16/0231* (2013.01); *G06F 8/65* (2013.01); *B60W 2556/45* (2020.02)

(58) Field of Classification Search  
CPC ....................................................... G06F 8/65  
See application file for complete search history.

(56) References Cited

U.S. PATENT DOCUMENTS 6,484,082 B1 * 11/2002 Millsap ............... H04L 12/4035  
701/32.7  
2018/0136924 A1     5/2018 Okuyama et al.  
(Continued)

FOREIGN PATENT DOCUMENTS

DE     10 2017 204 691 B3     6/2018  
DE     10 2018 117 708 A1     1/2019  
(Continued)

OTHER PUBLICATIONS

International Search Report (PCT/ISA/210) issued in PCT Application No. PCT/JP2021/033760 dated Dec. 7, 2021 with English translation (4 pages).  
(Continued)

*Primary Examiner* — Duy Khuong T Nguyen  
(74) *Attorney, Agent, or Firm* — Crowell & Moring LLP

(57) ABSTRACT

Provided is a technology capable of adding a new function by updating a program of an in-vehicle computer system. An in-vehicle computer system includes a plurality of ECUs. Each ECU is able to communicate with at least one other ECU via a communication bus. An in-vehicle computer system includes a measurement means that measures an ECU state for the ECUs, an estimation means that estimates a vehicle state based on the ECU state and a connection configuration of a communication bus, and a management means that acquires an update program and execution conditions of the update program. The management means selects a first ECU that is to execute the update program based on the vehicle state and the execution conditions. The first ECU executes the update program. The management means determines whether or not an output delay constraint (Continued)

START

ACQUIRE UPDATE PROGRAM AND EXECUTION CONDITION BY DRIM — 801

MEASURE PROCESSOR STATE BY VLASE (PROGRAM BEING EXECUTED, PROCESSOR LOAD, MEMORY USAGE, COMMUNICATION BUS USAGE, ETC.) — 802

ESTIMATE VEHICLE STATE BY VASEM — 803

DETERMINE RESOURCE BY DRIM — 804

DETERMINE TIME REQUIRED FOR STARTING AND TERMINATING EXECUTION BY DRIM — 805

IS SAFETY CRITERION SATISFIED? — 806  No

Yes

A

DETERMINATION CRITERION MAY CHANGE DEPENDING ON VEHICLE SPEED

CAN VEHICLE BE SAFELY PARKED? — 815  No

Yes

AFTER PARKING

A

OPERATE IN SAFE ADAS MODE OR CONTINUOUSLY OPERATE IN AD/ADAS MODE AT THAT TIME POINT — 816 of the update program is satisfied. The management means terminates execution of a redundancy program redundant to the update program.

5 Claims, 11 Drawing Sheets

(56)                    References Cited

U.S. PATENT DOCUMENTS

| | | |
|---|---|---|
| 2019/0034197 A1 | 1/2019 | Lin et al. |
| 2019/0205115 A1* | 7/2019 | Gomes .................... H04W 4/50 |
| 2021/0155173 A1* | 5/2021 | Harata .................... G06F 8/654 |
| 2021/0155176 A1 | 5/2021 | Harata et al. |
| 2021/0165444 A1 | 6/2021 | Otsuka et al. |
| 2022/0004374 A1 | 1/2022 | Kamiguchi |

FOREIGN PATENT DOCUMENTS

| | | |
|---|---|---|
| JP | 2018-81470 A | 5/2018 |
| JP | 2019-26250 A | 2/2019 |
| JP | 2020-27669 A | 2/2020 |
| WO | WO 2018/198783 A1 | 11/2018 |
| WO | WO 2020/095645 A1 | 5/2020 |

OTHER PUBLICATIONS

Japanese-language Written Opinion (PCT/ISA/237) issued in PCT Application No. PCT/JP2021/033760 dated Dec. 7, 2021 (3 pages).
German Office Action of Corresponding German Application No. 11 2021 00 067.8 dated Apr. 27, 2026 with English translation (9 pages).

* cited by examiner

FIG. 1

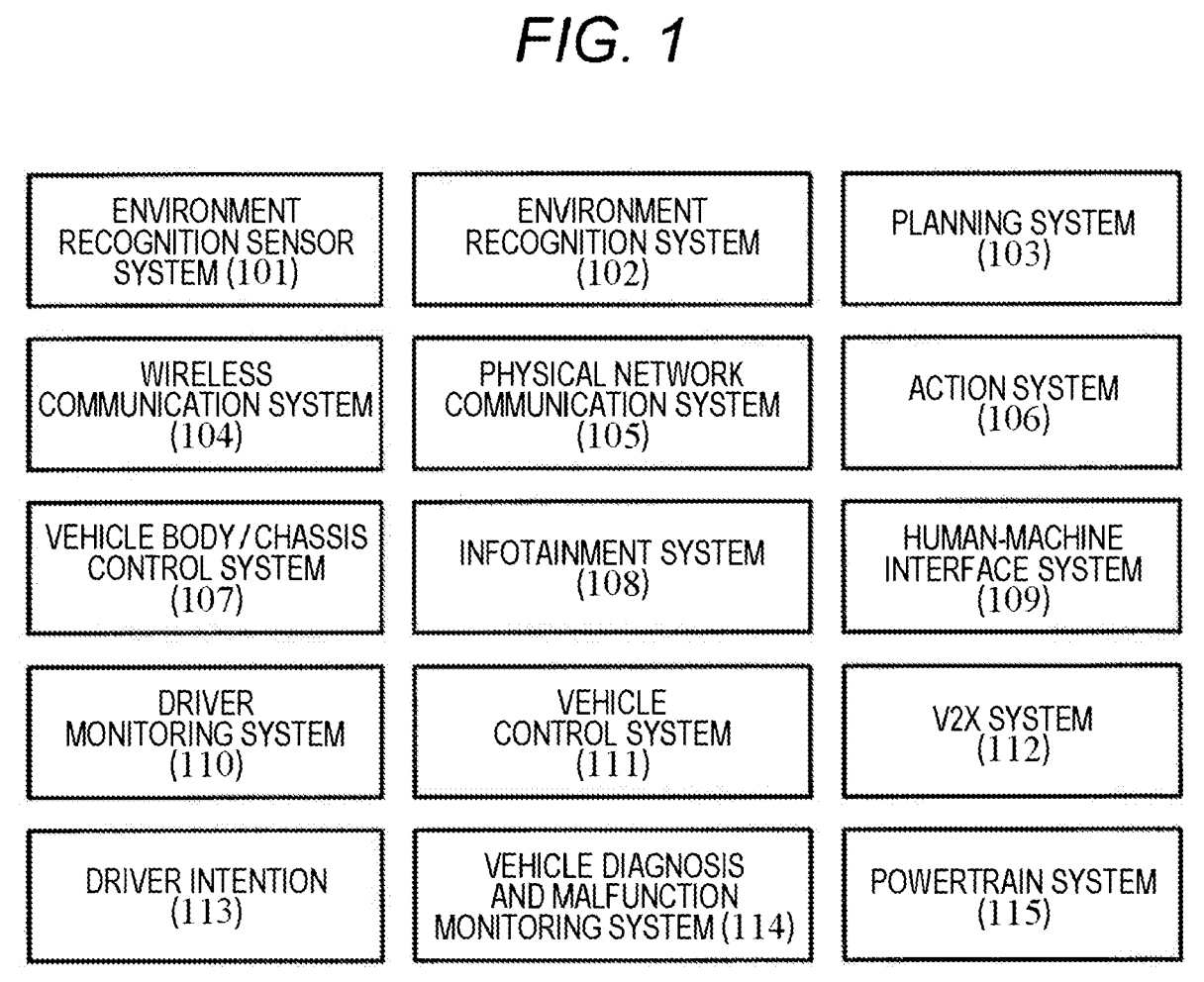

| | | |
|---|---|---|
| ENVIRONMENT RECOGNITION SENSOR SYSTEM (101) | ENVIRONMENT RECOGNITION SYSTEM (102) | PLANNING SYSTEM (103) |
| WIRELESS COMMUNICATION SYSTEM (104) | PHYSICAL NETWORK COMMUNICATION SYSTEM (105) | ACTION SYSTEM (106) |
| VEHICLE BODY / CHASSIS CONTROL SYSTEM (107) | INFOTAINMENT SYSTEM (108) | HUMAN-MACHINE INTERFACE SYSTEM (109) |
| DRIVER MONITORING SYSTEM (110) | VEHICLE CONTROL SYSTEM (111) | V2X SYSTEM (112) |
| DRIVER INTENTION (113) | VEHICLE DIAGNOSIS AND MALFUNCTION MONITORING SYSTEM (114) | POWERTRAIN SYSTEM (115) |

FIG. 4

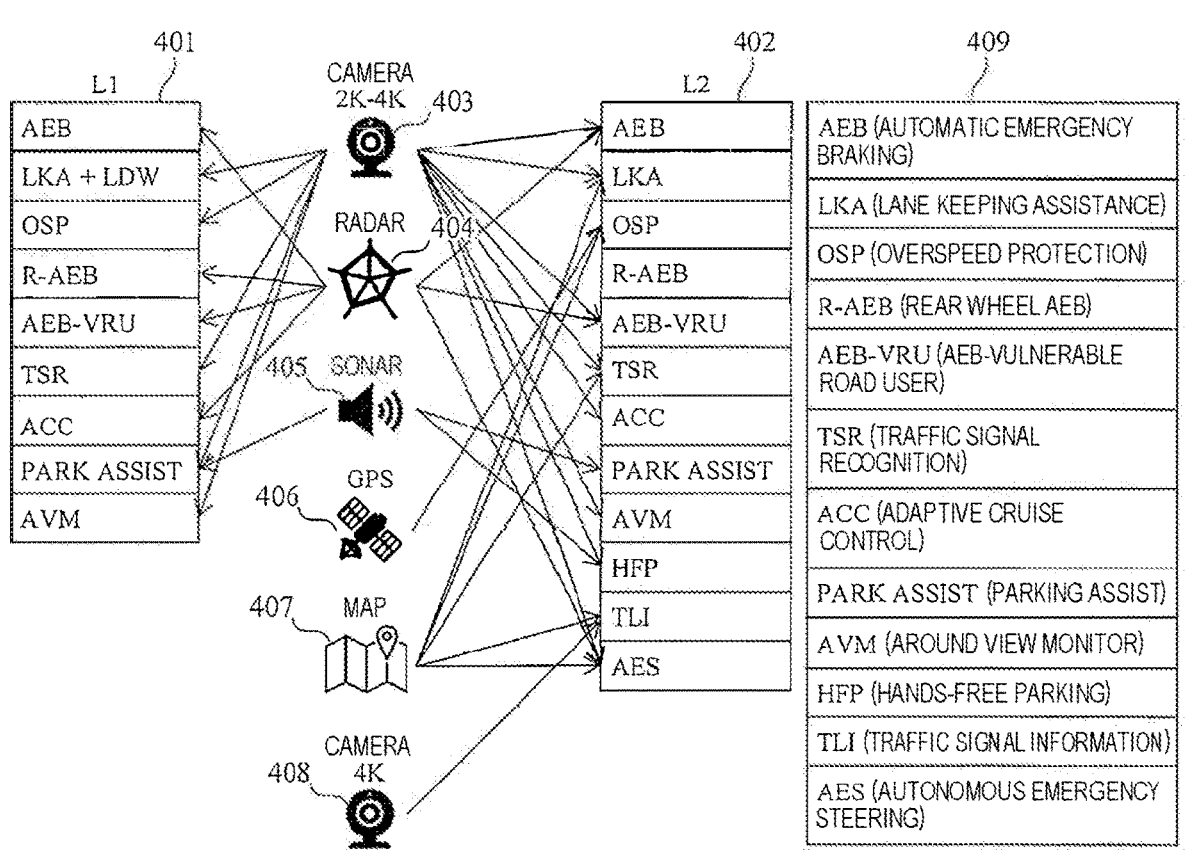

| | | |
|---|---|---|
| | | AEB (AUTOMATIC EMERGENCY BRAKING) |
| | | LKA (LANE KEEPING ASSISTANCE) |
| | | OSP (OVERSPEED PROTECTION) |
| | | R-AEB (REAR WHEEL AEB) |
| | | AEB-VRU (AEB-VULNERABLE ROAD USER) |
| | | TSR (TRAFFIC SIGNAL RECOGNITION) |
| | | ACC (ADAPTIVE CRUISE CONTROL) |
| | | PARK ASSIST (PARKING ASSIST) |
| | | AVM (AROUND VIEW MONITOR) |
| | | HFP (HANDS-FREE PARKING) |
| | | TLI (TRAFFIC SIGNAL INFORMATION) |
| | | AES (AUTONOMOUS EMERGENCY STEERING) |

FIG. 5

| | L1 | L2 | L3 | L4 | L5 |
|---|---|---|---|---|---|
| | FAIL-SAFE | | FAIL-OPERATIONAL | | |
| | 1oo1D | | 1oo2D | | |

FIG. 10

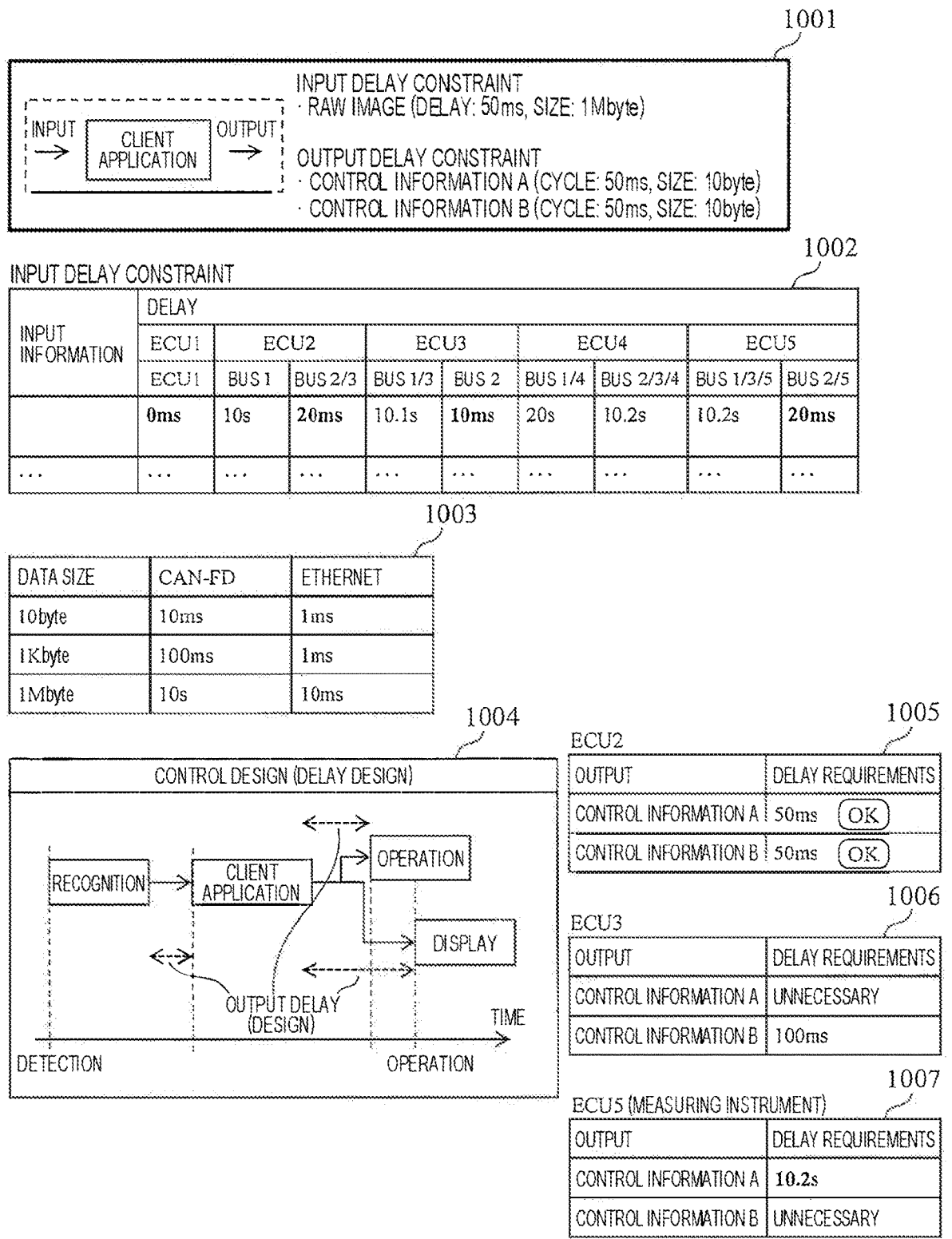

1001

| INPUT DELAY CONSTRAINT |
| --- |
| · RAW IMAGE (DELAY: 50ms, SIZE: 1Mbyte) |
| OUTPUT DELAY CONSTRAINT |
| · CONTROL INFORMATION A (CYCLE: 50ms, SIZE: 10byte) |
| · CONTROL INFORMATION B (CYCLE: 50ms, SIZE: 10byte) |

INPUT DELAY CONSTRAINT

1002

| INPUT INFORMATION | DELAY | | | | | | | | |
| --- | --- | --- | --- | --- | --- | --- | --- | --- | --- |
| | ECU1 | ECU2 | | ECU3 | | ECU4 | | ECU5 | |
| | ECU1 | BUS 1 | BUS 2/3 | BUS 1/3 | BUS 2 | BUS 1/4 | BUS 2/3/4 | BUS 1/3/5 | BUS 2/5 |
| | 0ms | 10s | 20ms | 10.1s | 10ms | 20s | 10.2s | 10.2s | 20ms |
| ... | ... | ... | ... | ... | ... | ... | ... | ... | ... |

1003

| DATA SIZE | CAN-FD | ETHERNET |
| --- | --- | --- |
| 10byte | 10ms | 1ms |
| 1Kbyte | 100ms | 1ms |
| 1Mbyte | 10s | 10ms |

1004

| CONTROL DESIGN (DELAY DESIGN) |
| --- |

1005

ECU2

| OUTPUT | DELAY REQUIREMENTS |
| --- | --- |
| CONTROL INFORMATION A | 50ms (OK) |
| CONTROL INFORMATION B | 50ms (OK) |

1006

ECU3

| OUTPUT | DELAY REQUIREMENTS |
| --- | --- |
| CONTROL INFORMATION A | UNNECESSARY |
| CONTROL INFORMATION B | 100ms |

1007

ECU5 (MEASURING INSTRUMENT)

| OUTPUT | DELAY REQUIREMENTS |
| --- | --- |
| CONTROL INFORMATION A | 10.2s |
| CONTROL INFORMATION B | UNNECESSARY |

DRIM

RAM

UPDATE PROGRAM

HEARTBEAT SIGNAL     HEARTBEAT SIGNAL

DRIC            DRIC

DRIC:
- DETECT FAILURE IN MANAGEMENT MEANS BASED ON LACK OF HEARTBEAT SIGNAL
- IGNORE SIGNAL AFTER DETECTION, WHEN FAILURE OF DRIM IS DETECTED
- TRANSMIT FAILURE INFORMATION TO OTHER DRIC, WHEN FAILURE OF DRIM IS DETECTED
- IGNORE SIGNAL AFTER RECEPTION, WHEN FAILURE INFORMATION IS RECEIVED

IN-VEHICLE COMPUTER SYSTEM AND AUTONOMOUS DRIVING ASSISTANCE SYSTEM

TECHNICAL FIELD

The present invention relates to an in-vehicle computer system and an autonomous driving assistance system.

BACKGROUND ART

In an in-vehicle computer system, it is possible to update or upgrade an electronic control device using an over the air (OTA) technology or the like.

For example, PTL 1 discloses a vehicle program rewriting system. In the configuration described in PTL 1, a center device displays update data of a plurality of update target devices, target device IDs, and whether program storage memories of the target devices are a single-sided memory or a multi-sided memory, stores a delivery package including specification data and update data that indicate an ID, a memory configuration, and an address for a target device which are generated in accordance with a predetermined data structure based on a memory configuration which is to be referred to at a time of updating and a rollback of the target device and an address for reading the update data, and delivers the delivery package to a vehicle-side system in response to a notification from the vehicle-side system. The vehicle-side system refers to the received delivery package to determine whether or not it is possible to perform writing to the memory while the vehicle is running, controls program update of the target device, and controls a rollback based on the memory configuration when the program update is cancelled during updating.

CITATION LIST

Patent Literature

PTL 1: JP 2020-027669 A

SUMMARY OF INVENTION

Technical Problem

However, the conventional technology has a problem in that it is difficult to add a new function by program updating of the in-vehicle computer system.

In the configuration of PTL 1, an in-vehicle central unit and a distribution unit are not designed to integrate a new function, nor are the units designed to integrate smart infrastructure-based autonomous driving (AD) or advanced driver assistance system (ADAS) applications. The configuration of PTL 1 only handles firmware or version update and cannot update functions. Therefore, in the configuration of PTL 1, a new function cannot be added by program updating.

The present invention has been made to solve such a problem, and an object thereof is to provide a technology capable of adding a new function by program updating of an in-vehicle computer system.

Solution to Problem

As an example of an in-vehicle computer system according to the present invention, there is provided an in-vehicle computer system that is able to communicate with a computer outside a vehicle, and has a plurality of ECUs, each of the ECUs being able to communicate with at least one other ECU via a communication bus, the in-vehicle computer system including: measurement means that measures an ECU state for the ECUs; estimation means that estimates a vehicle state based on the ECU state and a connection configuration of the communication bus; and management means that acquires an update program and execution conditions of the update program. The management means selects a first ECU that is to execute the update program based on the vehicle state and the execution conditions. The first ECU executes the update program. The management means determines whether or not an output delay constraint of the update program is satisfied. The management means terminates execution of a redundancy program redundant to the update program.

An example of an autonomous driving assistance system according to the present invention includes the in-vehicle computer system described above; and a computer outside the vehicle.

This specification includes the disclosed content of JP 2021-021914 on which priority of the present application is based.

Advantageous Effects of Invention

According to an n in-vehicle computer system and an autonomous driving assistance system of the present invention, a new function can be added by updating a program of the in-vehicle computer system.

BRIEF DESCRIPTION OF DRAWINGS

FIG. 1 illustrates an example of various modules arranged in an autonomous driving assistance system including an in-vehicle computer system according to Example 1 of the present invention.

FIG. 4 illustrates an example of a sensor used in the in-vehicle computer system according to Example 1.

FIG. 5 illustrates an example of an architecture of the in-vehicle computer system according to Example 1.

Figure 2:
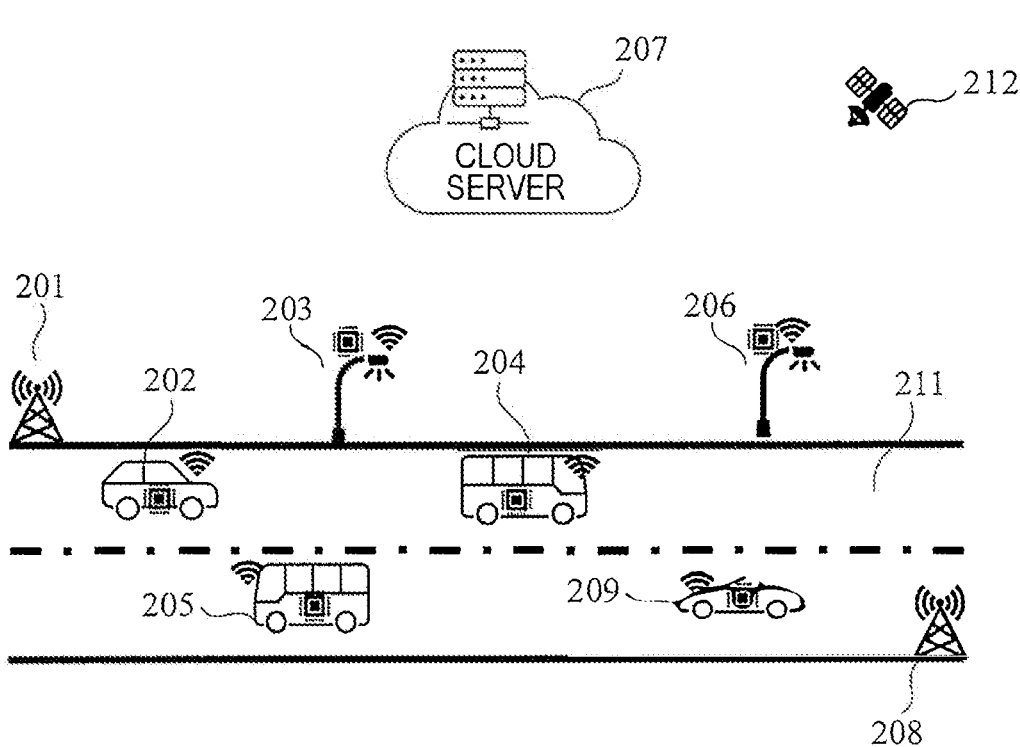
FIG. 2 illustrates an example of an autonomous driving environment including the in-vehicle computer system according to Example 1.

FIG. illustrates an example of information used in the in-vehicle computer system according to Example 1.

FIG. illustrates an example of a relationship between management means DRIM and execution means DRIC in Example 1.

DESCRIPTION OF EMBODIMENTS

Hereinafter, examples of the present invention will be described with reference to the accompanying drawings. The following is an example and does not limit the present invention.

Example 1

FIG. 1 illustrates an example of various modules arranged in an autonomous driving assistance system including an in-vehicle computer system according to Example 1 of the present invention. Example 1 may integrate smart infrastructure, connected services, and cloud-based autonomous driving applications into an in-vehicle AD/ADAS program to extend autonomous driving capabilities of a vehicle.

AD means, for example, autonomous driving, and ADAS means, for example, an advanced driver assistance system. In this specification, a program means, for example, an application program, but is not limited thereto.

For optimal utilization of in-vehicle electrical and electronic (EE) resources and for secure integration and in-vehicle AD/ADAS extended mode transition, a vehicle may execute or derive in-vehicle EE resources and network resources.

Similarly, the vehicle may have a knowledge base of a dynamic operating and driving design domain such as environmental conditions, an environment recognition algorithm, an optimal throughput requirement, and the like.

Based on the resource requirements and resource availability of smart infrastructure, connected services, and cloud-based autonomous driving applications, the in-vehicle computer system according to Example 1 can allocate required resources for safety and optimal throughput.

In addition, based on the application requirement, rerouting and scheduling of the application data are also performed.

An autonomous driving vehicle is controlled using a vehicle control system (e.g., AD/ADAS system). The vehicle control system includes a plurality of environment recognition sensors, vehicle sensors, localization sensors, actuators (a brake, a steering, a throttle, a powertrain, etc.), or the like which are configured in a zone-based or domain-based EE architecture.

The vehicle control system includes a plurality of modules that communicate with each other. It is advantageous to have multiple modules cooperate. In addition, each module may include a plurality of programs that request sensor data, recognition data, plan data, application state data, or the like. The modules or programs may have one or more resource requirements and priorities in a critical driving scenario and a vehicle control system state. In order to make these tasks work together, it is advantageous to adapt the priority and deadline of each task/service depending on the state of the available resources.

For example, when a vehicle capable of communicating with the smart infrastructure or the roadside device cloud-based remote server is traveling on a smart highway that can assist or fully take over vehicle control, the autonomous driving capabilities of the vehicle may be extended.

Depending on the resource requirements of a client application, a functional block according to Example 1 can integrate the client application into an in-vehicle AD/ADAS application for safe mode transition.

For example, a smart highway may provide a highway pilot line application that can provide hands-free super-cruise and lane change capabilities. In such a scenario, the in-vehicle side hands-on/off adaptive cruise control (ACC) (semi-autonomous driving vehicle) and lane keeping assistance (LKA) can be stopped. However, a safety critical application such as an automatic emergency braking (AEB) collision avoidance application needs to cooperate with the client application.

In a combination of the client application and the in-vehicle AD/ADAS safety application, real-time/soft time delay constraint may become strict. In such a scenario, the in-vehicle computer system according to Example 1 can also perform scheduling and rerouting of application data.

As another example, vehicle detections using radar, LiDAR, a camera, etc. have respective different network bandwidth requirements. A data size required by a radar network bandwidth for a deadline may be much smaller than for a camera. When a client application of the smart infrastructure is added to an in-vehicle AD/ADAS application, the AD/ADAS application may be executed in a minimum resource requirement mode.

Similarly, automatic parking and optimal power utilization are also possible. In an advanced autonomous driving vehicle equipped with a fail-operational vehicle control system, the in-vehicle computer system according to Example 1 can utilize an autonomous driving capability of the smart infrastructure to reduce in-vehicle power consumption.

The in-vehicle computer system according to Example 1 is mounted on, for example, an automobile having an autonomous driving capability; however, "in-vehicle" means being mounted on a movable device and is not particularly limited to being mounted on an automobile. As another example, the in-vehicle computer system can be mounted on a bus, a truck, a construction machine, a ground robot, a warehouse robot, an airplane, a helicopter, a boat, a ship, a farm machine, a service robot, a train, a golf cart, or the like.

FIG. 1 illustrates an example of various modules that can be arranged in an autonomous driving assistance system including the in-vehicle computer system according to Example 1. The autonomous driving assistance system includes the in-vehicle computer system and a computer outside a vehicle. The autonomous driving vehicle can be set in an autonomous mode and can automatically drive the vehicle in accordance with a predetermined driving scenario with or without assistance from a safe driver.

The in-vehicle computer system includes an environment recognition sensor system 101, an environment recognition system 102 (which collects information about driving scenarios), a planning system 103, a wireless communication system 104, a physical network communication system 105, an action system 106, a vehicle body/chassis control system 107, an infotainment system 108, a human-machine interface system 109, a driver monitoring system 110, a vehicle control system 111, a V2X system 112, a driver intention 113, a vehicle diagnosis and malfunction monitoring system 114, and a powertrain system 115.

The autonomous driving vehicle can travel in any one of a manual mode, a fully automatic mode, and a semi-automatic mode. The vehicle does not need to include all the modules in FIG. 1, and some of the modules may be omitted.

The autonomous driving vehicle may further include an engine, wheels, a steering wheel, a transmission, and the like, which may be controlled by a vehicle control system. The autonomous driving vehicle may further include a physical network (wired network) or wireless network that enables the modules to communicate with each other. The network may be redundant.

FIG. 2 illustrates an example of an autonomous driving environment including the in-vehicle computer system according to Example 1. This example relates to a smart highway. The smart highway can include roadside devices 201 and 208 and smart infrastructures 203 and 206 to monitor driving scenarios.

The smart infrastructures 203 and 206 can communicate with a cloud server 207. The smart infrastructures 203 and 206 can process driving scenario information acquired by recognition sensors. The cloud server 207 processes a smart highway driving scenario to derive driving behaviors required for safe navigation of vehicles 202, 204, 205, and 209.

The smart infrastructures 203 and 206 are capable of communicating with each vehicle and the cloud server 207 either directly or via a roadside device. Each vehicle is capable of fully or semi-autonomous driving and can communicate with a roadside device, a smart infrastructure, and one other vehicle. Each vehicle can use driving scenario recognition and driving behavior information for safe traveling. The autonomous driving environment may include a road surface 211 (strictly a computer disposed with respect to the road surface, which may be embedded in a road, hereinafter, the same applying to the "road surface") and a satellite 212.

The in-vehicle computer system according to Example 1 can be mounted on the vehicles 202, 204, 205, and 209, for example. The in-vehicle computer system can communicate with a computer outside the vehicle. Examples of the computer outside the vehicle include the roadside devices 201 and 208, the smart infrastructures 203 and 206, the cloud server 207, the road surface 211, the satellite 212, and the like.

Figure 3:
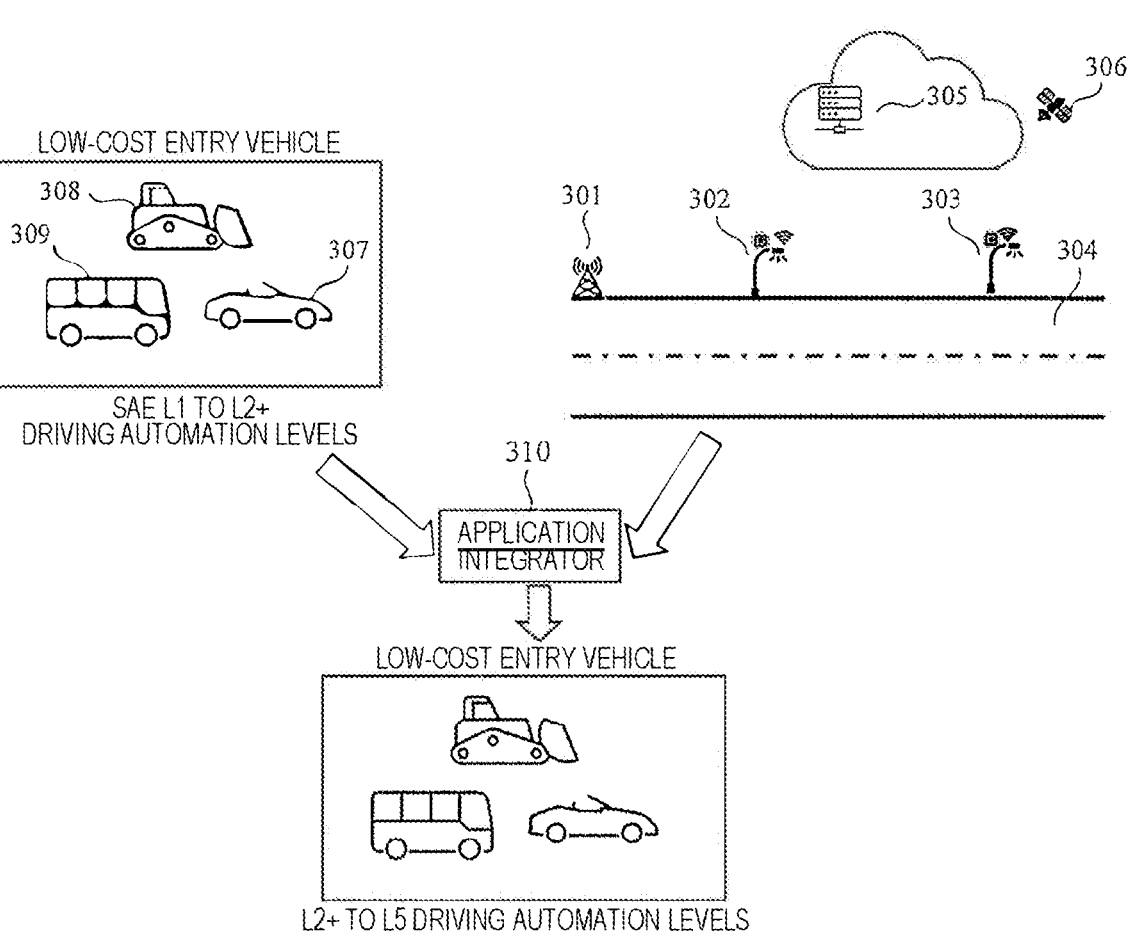
FIG. 3 illustrates a conceptual diagram of an operation of adding a new function to the in-vehicle computer system according to Example 1.

FIG. 3 is a conceptual diagram of an operation of adding a new function to an AD/ADAS-compatible vehicle according to Example 1. The in-vehicle computer system according to Example 1 is mounted on the vehicles 307 to 309. The vehicles 307 to 309 are low-cost entry vehicles or mid-range vehicles that conform to SAE standards L1 to L2+ and have autonomous driving capabilities.

The vehicles 307 to 309 are traveling on a smart highway that can provide driving behavior necessary to navigate the smart highway safely. In this case, the vehicles 307 to 309 can be extended to the SAE standards L2+ to L5 by communicating with a computer outside the vehicle (for example, a roadside device 301, smart infrastructures 302 and 303, a road surface 304, a cloud server 305, a satellite 306, or the like.).

Such an operation can be realized by an application integrator 310. The application integrator 310 can operate on the in-vehicle computer system and can integrate the autonomous driving applications provided by the smart highway into the in-vehicle computer system to extend the capabilities of the in-vehicle computer system.

FIG. 4 illustrates an example of a sensor used in the in-vehicle computer system according to Example 1. The in-vehicle computer system can include various sensors 403 to 408. Each sensor provides information necessary for various functions of standards L1 (401) and L2 (402) of the in-vehicle computer system. Abbreviations of the respective standards are represented by 409.

Extension of the autonomous driving capability results in an increase in resource costs of AD/ADAS applications. According to Example 1, the capability of the SAE standard L1 can be extended by using a smart infrastructure, a cloud server, a connected service, or the like.

FIG. 5 illustrates an example of an architecture of the in-vehicle computer system according to Example 1. When an autonomous driving level is the standards L1 and L2, the safety is "fail safe", and the architecture is the standard 1001D. When the autonomous driving level is the standards L3 to L5, the safety is "fail operational", and the architecture is the standard 1002D.

An increase in level of autonomous driving results in an increase in computational costs. The in-vehicle computer system according to Example 1 can cover all the AD/ADAS levels of the SAE standards. The in-vehicle computer system can utilize the driving scenario recognition and the driving behavior capability for autonomous driving capability extension of the vehicle, by utilizing the smart infrastructure, the cloud server, the autonomous driving application, or the like.

Figure 6:
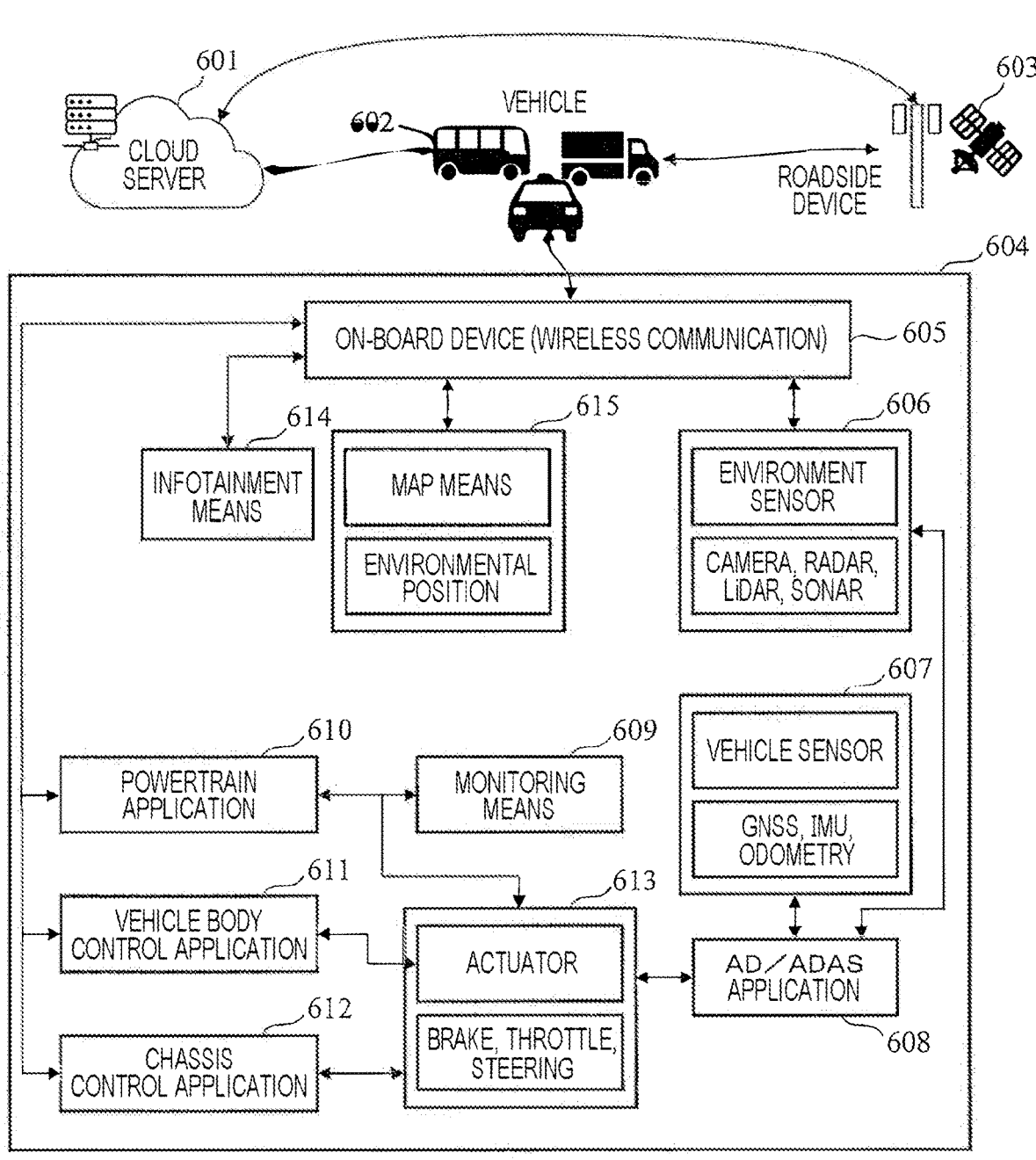
FIG. 6 illustrates an example of a functional block configuration of the in-vehicle computer system according to Example 1.

FIG. 6 is an example of a functional block configuration of the in-vehicle computer system according to Example 1. A vehicle 602 can communicate with a cloud server 601, a roadside device 603, or the like. An in-vehicle computer system 604 mounted on the vehicle 602 includes an on-board device 605, an environment sensor 606 (camera, radar, LiDAR, sonar, etc.), a vehicle sensor 607 (GNSS, IMU, odometry, etc.), an AD/ADAS application 608, monitoring means 609, a powertrain application 610, a vehicle body control application 611, a chassis control application 612, an actuator 613 (brake, throttle, steering, etc.), infotainment means 614, and map means 615 (environmental position means or the like).

The in-vehicle computer system 604 can be configured in various in-vehicle EE environments. For example, an integrated domain architecture, a hybrid zone-domain architecture, a zone architecture, or the like can be configured.

Figure 7:
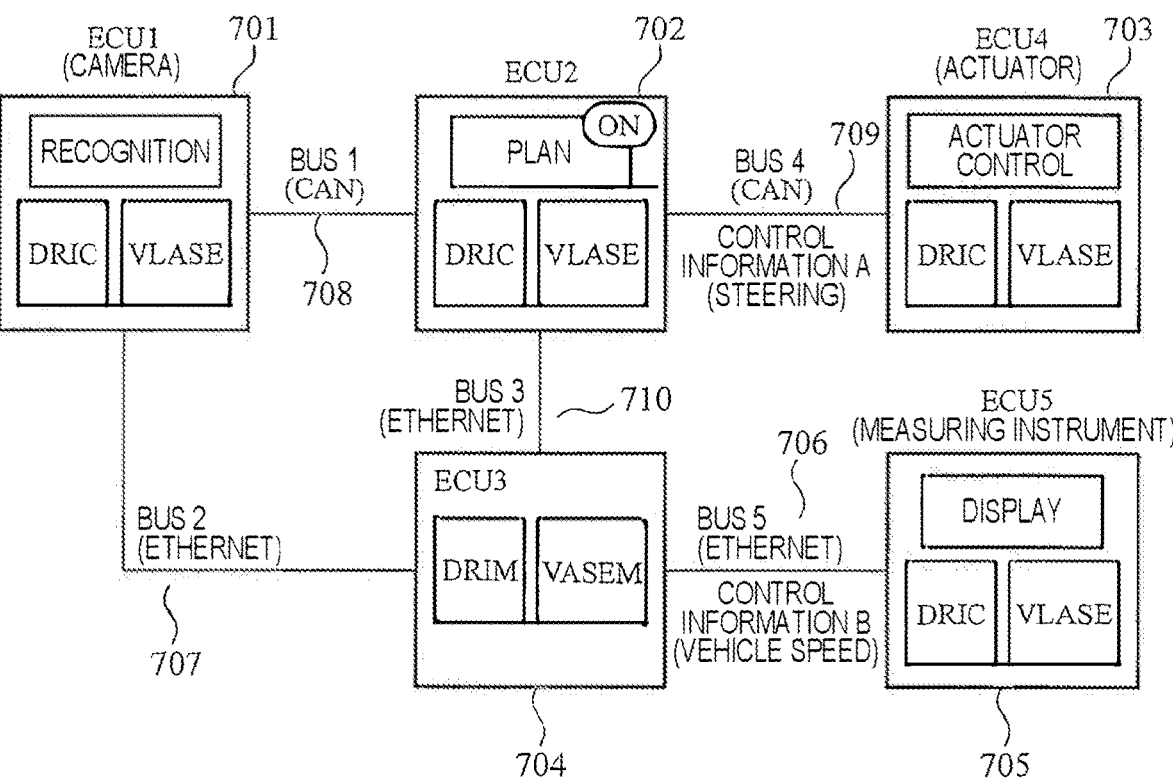
FIG. 7 illustrates an arrangement example of a program for a plurality of ECUs in the in-vehicle computer system according to Example 1.

FIG. 7 is an arrangement example of programs for a plurality of ECUs in the in-vehicle computer system according to Example 1. The in-vehicle computer system includes ECUs 1 to 5 (701 to 705). Each ECU can communicate with at least one other ECU via communication buses 706 to 710.

Although not specifically illustrated, each ECU includes a processor and storage means. The processor can function as arithmetic means and can execute a program. The storage means may store a program. The processor executes this program, and thereby the ECUs function as various means to be described below. In this manner, the in-vehicle computer system implements functions to be described in this example.

The in-vehicle computer system includes measurement means VLASE (Vehicle Local Area State Estimator) that measures an ECU state of the ECUs. For example, an ECU executes a predetermined VLASE program, and thereby the measurement means VLASE is implemented. In the example of FIG. 7, the measurement means VLASE are arranged in the ECU 1, the ECU 2, the ECU 4, and the ECU 5.

The ECU state includes information indicating a program being executed in the ECU. For example, the ECU 1 executes a recognition program, the ECU 2 executes a planning program, the ECU 3 is a master ECU, the ECU 4 executes an actuator control program, and the ECU 5 executes a display program.

In addition, the ECU state may include a processor load, a memory usage, and a communication bus usage in the corresponding ECU.

The in-vehicle computer system includes estimation means VASEM that estimates a vehicle state. In the example of FIG. 7, the estimation means VASEM is installed in the ECU 3 (704).

The estimation means VASEM (Vehicle Architecture State Estimator Master) estimates the vehicle state based on the ECU state and a connection configuration of the communication bus. The vehicle state is, for example, information obtained by combining the ECU state and the connection configuration of the communication bus. In the example of FIG. 7, the estimation means VASEM is installed in the ECU 4.

Besides, the measurement means VLASE may also be installed in the ECU 3 (704). Alternatively, the estimation means VASEM may have a function of the measurement means VLASE.

The connection configuration of the communication bus includes information indicating which two ECUs are connected to each by each communication bus. For example, the ECU 1 and the ECU 2 are connected via a communication bus 1 (708). The ECU 2 and the ECU 3 are connected via a communication bus 3 (710). The ECU 1 and the ECU 3 are connected via a communication bus 2 (707). The ECU 2 and the ECU 4 are connected via a communication bus 4 (709). The ECU 3 and the ECU 5 are connected via a communication bus 5 (706).

In addition, for example, the ECU 1 and the ECU 4 are not directly connected by a communication bus and need to be connected via the communication bus 1, the ECU 2, and the communication bus 4. The information indicating such a connection configuration of the communication buses may be actively generated through measurement or the like performed by the estimation means VASEM or may be stored in the storage means of each ECU in advance.

The in-vehicle computer system includes management means DRIM (Dynamic Reconfiguration Indicator Master). In the example of FIG. 7, the management means DRIM is installed in the ECU 3 (704). The management means DRIM acquires an update program and execution conditions of the update program. A specific example of the execution conditions will be described below with reference to FIG. 10.

The in-vehicle computer system includes execution means DRIC (Dynamic Reconfiguration Indicator Client). In the example of FIG. 7, the execution means DRIC are arranged in the ECU 1, the ECU 2, the ECU 4, and the ECU 5. The execution means DRIC causes the ECU to execute or terminate a specific program. For example, the execution means DRIC of the ECU 2 causes the ECU 2 to execute the planning program. The execution means DRIC may perform processing called program installation.

Besides, the execution means DRIC may also be installed in the ECU 3 (704). Alternatively, the management means DRIM may have the function of the execution means DRIC.

Figure 8A:
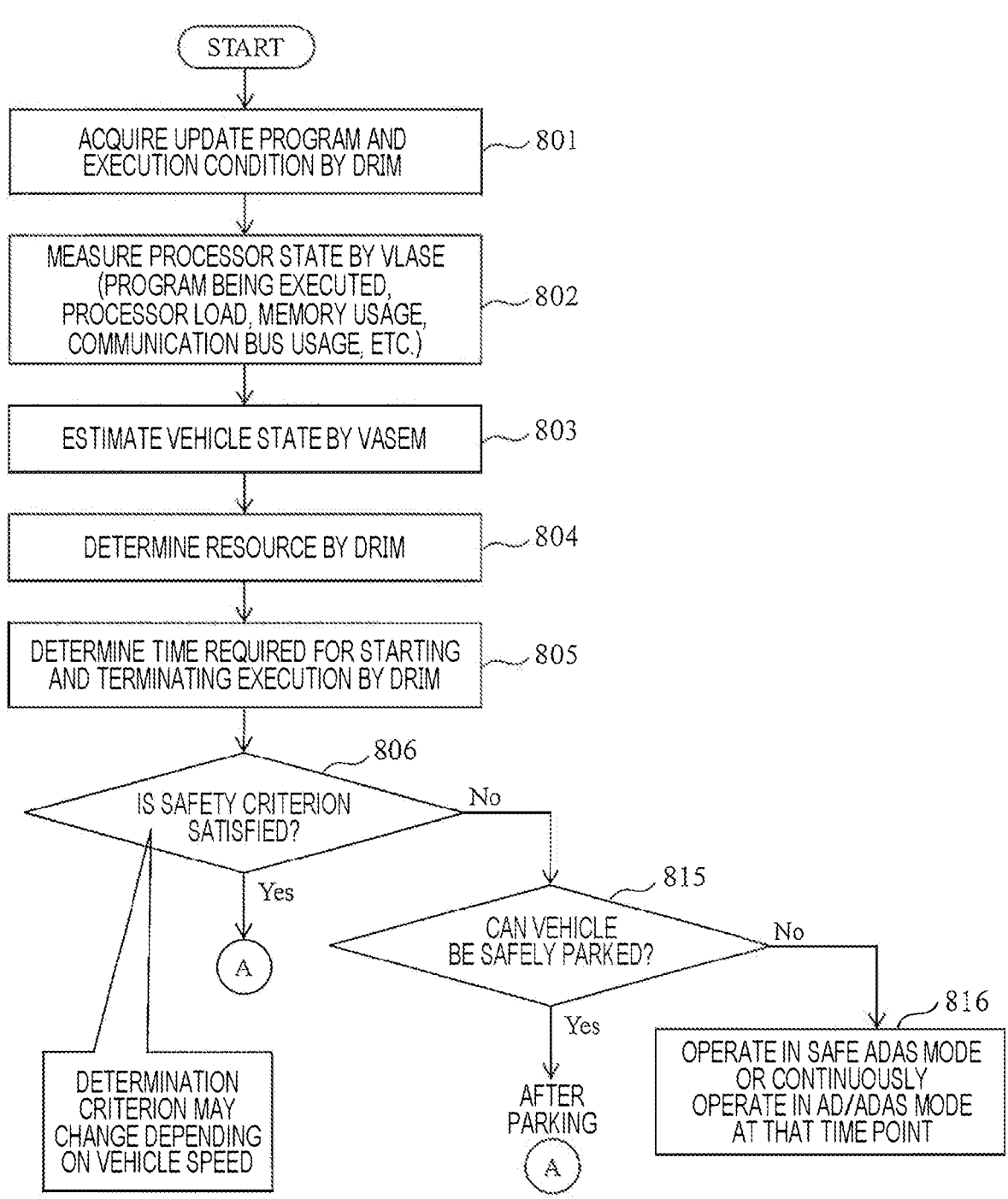
FIG. 8A is a part of a flowchart illustrating an operation example of the in-vehicle computer system according to Example 1.
Figure 8B:
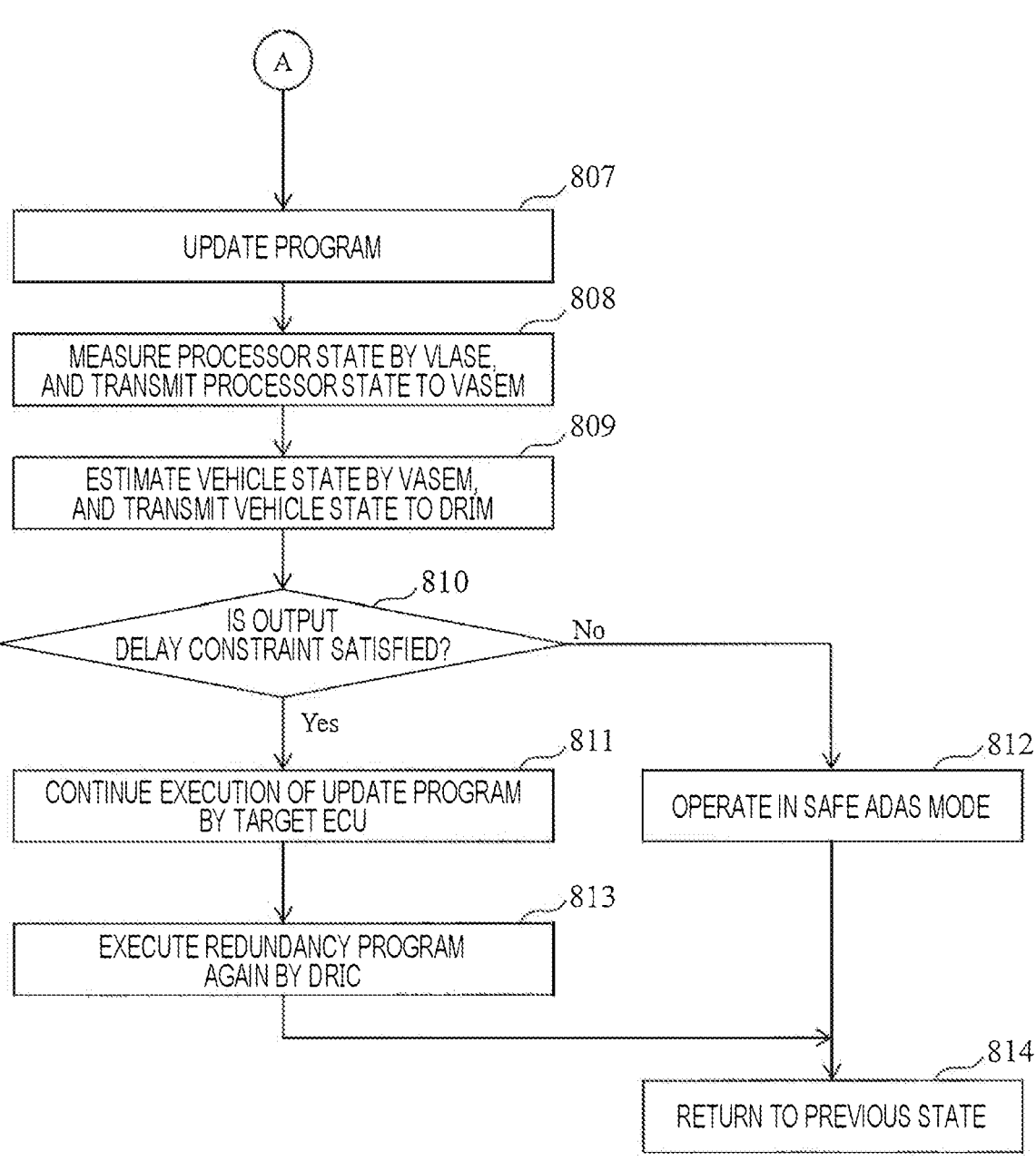
FIG. 8B is a part of a flowchart illustrating an operation example of the in-vehicle computer system according to Example 1.

FIGS. 8A and 8B are flowcharts illustrating an operation example of the in-vehicle computer system according to Example 1. First, the management means DRIM acquires an update program and execution conditions thereof (Step 801). The update program and the execution conditions thereof can be acquired through any route, but may be stored in a storage means of any ECU in advance, or may be acquired from a computer outside the vehicle, for example.

Next, the measurement means VLASE measures the ECU state for each ECU (Step 802). The measurement means VLASE transmits the measured ECU state to the estimation means VASEM. As described above, the ECU state can include information indicating a program being executed in the corresponding ECU and can also include a processor load, a memory usage, a communication bus usage, or the like in the corresponding ECU.

Next, the estimation means VASEM estimates the vehicle state (Step 803) and notifies the management means DRIM of the vehicle state.

Next, the management means DRIM determines a resource to be allocated to the update program (Step 804). The resource includes, for example, a processor load, a memory usage, and a communication bus usage. A method of determining the resource to be allocated can be appropriately designed by those skilled in the art. For example, information indicating the amount of necessary resources may be acquired in association with the update program. The amount of resources to be allocated may change depending on the resources available in the in-vehicle computer system.

Next, the management means DRIM determines a time required for starting (or installing) the execution of the update program and terminating the execution of the redundancy program (Step 805). The redundancy program means a program redundant for the update program. For example, in a case where a certain update program includes all functions of the planning program, the planning program is a redundancy program for the update program.

A method of determining which program is a redundancy program for a certain update program can be appropriately designed by those skilled in the art. For example, an ID may be assigned to each program, and the ID of the redundancy program may be associated with the update program in advance. In this case, the redundancy program can be identified by acquiring the ID of the redundancy program together with the update program in Step 801. Alternatively, the in-vehicle computer system may determine that the program that outputs the same type of data as the update program (for example, data for the same display device) is the redundancy program.

In addition, a method of determining the time required for starting and terminating the execution can be appropriately designed by those skilled in the art. For example, the time may be determined depending on a size of each program, or the time may be associated with each program and stored in the storage means in advance. Further, the time may be calculated or modified based on various other items of information.

Next, the management means DRIM determines whether or not the time required for starting the execution of the update program and terminating the execution of the redundancy program satisfies a predetermined safety criterion (Step 806). For example, it is determined whether the execution is completed within a predetermined reference time. During an execution starting process of the update program and an execution terminating process of the redundancy program, there is a period during which the function of each program is not exerted, and thus, it is advantageous to determine whether or not this period affects safe control of the vehicle.

The safety criterion in Step 806 may be fixed, may be a criterion associated with each program, or may be a criterion that changes depending on other conditions. For example, the reference may change depending on the vehicle speed at that time point. For example, while the vehicle is stopped or traveling at a low speed (such as during execution of a parking operation), the safety is not affected even if the period during which the function of each program is not exerted is somewhat long. Hence, a reference time can be made longer than an initial value; however, when the period during which the function of each program is not exerted becomes long during traveling at a high speed (such as traveling on an expressway), the safety is affected, and thus a process needs to be completed in a short time. Consequently, the reference time becomes shorter than the initial value.

In Step 806, when the required time satisfies the safety criterion, the in-vehicle computer system updates the program (Step 807). For example, the management means DRIM selects an ECU (first ECU, hereinafter, referred to as a "target ECU") which is to execute the update program based on the vehicle state and the execution conditions of the update program. Then, an update program and an update request are transmitted to the selected target ECU. The target ECU that has received the update program and request starts execution of the update program by the function of the execution means DRIC.

In addition, the management means DRIM terminates the execution of the redundancy program. That is, a termination request of the redundancy program is transmitted to an ECU (target ECU or another ECU) executing the redundancy program. The ECU that has received the termination request terminates the execution of the redundancy program by the function of the execution means DRIC. As a result, consumption of unnecessary resources is suppressed. Here, the execution means DRIC may store information (program ID, program code, or the like) necessary for resuming the execution of the redundancy program later.

Next, the measurement means VLASE measures the ECU state after the processing of the execution means DRIC in Step 807 and transmits the ECU state to the estimation means VASEM (Step 808).

Next, the estimation means VASEM estimates the vehicle state on the basis of the updated ECU state and the like and notifies the management means DRIM of the vehicle state (Step 809).

Next, the management means DRIM determines whether or not an output delay constraint of the update program is satisfied (Step 810). A specific example of the output delay constraint and a determination process will be described below with reference to FIG. 10.

In Step 810, when the output delay constraint of the update program is satisfied, the target ECU continues to execute the update program, and thereby the in-vehicle computer system is operated in a new ADAS mode (Step 811).

After Step 811, the execution means DRIC (not limited to the target ECU) monitors the management means DRIM and, when a failure of the management means DRIM is detected, causes the redundancy program (that is, the program whose execution has been terminated by the management means DRIM in Step 807) to be executed again (Step 813). In this way, it is possible to resume the execution of the redundancy program erroneously terminated by the management means DRIM that has failed. Besides, a method of selecting an ECU that executes the redundancy program can be appropriately designed by those skilled in the art and, for example, the ECU that executed the redundancy program last can be selected.

On the other hand, in Step 810, when the output delay constraint of the update program is not satisfied, the in-vehicle computer system executes predetermined safety processing. In this example, the operation is performed in the safe ADAS mode (Step 812). Specific details of the safe ADAS mode can be appropriately designed by those skilled in the art. For example, a maximum value of the vehicle speed during autonomous driving is limited to a value smaller than a maximum value in normal driving, and thereby the vehicle is controlled to perform safe driving even when the output delay constraint is not satisfied.

After the execution of the redundancy program is started again in Step 813, or after step 812, the in-vehicle computer system returns to the previous state (Step 814). Here, a method of determining a state (backup or check point) to which the system is to return and specific processing for returning can be appropriately designed by those skilled in the art. For example, redundancy programs and other application programs may be recovered or reinstalled, and a system restart may be performed.

In step 806 (FIG. 8A) described above, when the time required for starting the execution of the update program and terminating the execution of the redundancy program does not satisfy the predetermined safety criterion, the in-vehicle computer system determines whether or not the vehicle can be safely stopped (Step 815). The specific details of this determination can be appropriately designed by those skilled in the art based on known autonomous driving technologies and the like. For example, the determination can be made based on a road on which the vehicle is traveling, a surrounding situation, a vehicle speed, or the like.

When the vehicle can be safely stopped, the in-vehicle computer system executes processes of Steps 807 to 814 in FIG. 8B after the vehicle is safely stopped. On the other hand, when the vehicle cannot be safely stopped, the in-vehicle computer system is operated in the safe ADAS mode or is continuously operated in the AD/ADAS mode at that time point (Step 816). In this case, the update program is not executed.

Figure 9:
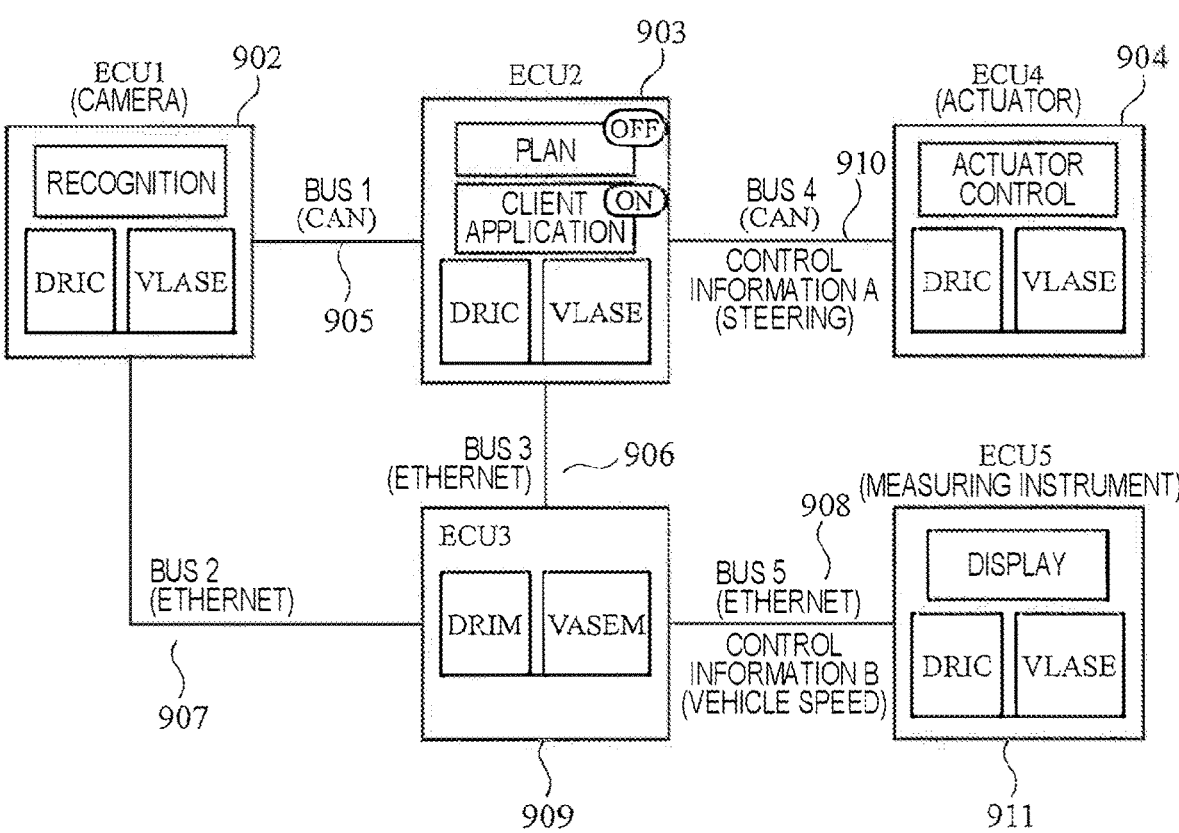
FIG. 9 illustrates an operation example in which a new function is added to the in-vehicle computer system according to Example 1.

An example of a determination process regarding the update program and the redundancy program will be described with reference to FIGS. 9 and 10. FIG. 9 is an operation example in which a new function is added to the in-vehicle computer system according to Example 1. FIG. 10 illustrates an example of information used in the in-vehicle computer system according to Example 1.

As illustrated in FIG. 9, the ECU 2 (903) executes the planning program. Here, it is assumed that an advanced client application including the function of the planning program is input to the in-vehicle computer system. The client application is an update program, and the planning program is a redundancy program for the client application. That is, as illustrated in the drawing, the client application is turned on, and the planning program is turned off.

As illustrated in FIG. 10, an input/output constraint 1001 related to the client application is defined in advance. The input/output constraint 1001 represents at least a part of the execution conditions and includes an input delay constraint and an output delay constraint. The input delay constraint includes, for example, a data size and a maximum allowable delay. In the example of FIG. 10, the input delay constraint is that an image having a size of 1 Mbyte (e.g., a raw image from a camera) needs to be input to the client application within 50 ms after generation (e.g., after output from a camera).

The output delay constraint includes, for example, a data size and a maximum allowable output cycle. In the example of FIG. 10, the output delay constraint is that data having a size of 10 bytes for each of the two types of control information (control information A and B) needs to be output at a cycle within 50 ms from the client application.

A specific example of a process of selecting the target ECU in Step 807 will be described below. In this example, in Step 807, the target ECU is selected using the execution conditions of update the program and the connection configuration of the communication bus. The execution conditions of the update program include, for example, an input delay constraint (and may further include an output delay constraint).

The connection configuration of the communication bus is illustrated by, for example, an input delay table 1002. In the input delay table 1002, the top row indicates an input delay related to a camera image (generated in the ECU 1). Each column represents an input delay from the ECU 1 to each ECU.

The input delay from the ECU 1 to the ECU 1 is 0 because the ECUs are the same. Since the input delay is within 50 ms, the input delay constraint is satisfied when the ECU 1 executes the client application. Therefore, the ECU 1 can be a target ECU.

The input delay from the ECU 1 to the ECU 2 is 10 s when passing through the communication bus 1 (CAN). Since the input delay exceeds 50 ms, the input delay constraint is not satisfied when communication is performed via the communication bus 1 when a client application is executed by the ECU 2. On the other hand, the input delay from the ECU 1 to the ECU 2 is 20 ms when passing through the communication bus 2 (Ethernet (registered trademark)) and the communication bus 3 (Ethernet). Since the input delay is within 50 ms, the input delay constraint is satisfied when communication is performed via the communication buses 2 and 3, in a case where the client application is executed by the ECU 2. Therefore, the ECU 2 can be set as the target ECU only when a specific communication route is used.

Although the same applies to the input delay related to other ECUs and thus the description thereof is omitted, the ECU 3 and the ECU 5 can be set as the target ECU only when a specific communication route is used, and the ECU 4 cannot be set as the target ECU since the input delay constraint is not satisfied through any communication route. Such determination processing enables an appropriate target ECU and communication route to be selected.

Besides, specific process for limiting the communication route can be appropriately designed by those skilled in the art. For example, the management means DRIM notifies each ECU of a transmission route of information of a client application, and each ECU transmits and receives information according to the transmission route.

As in this example, when a plurality of ECUs can be set as the target ECUs, the ECU state may be used as a determination criterion for which ECU is selected as the target. For example, for each ECU, a total load may be calculated based on the processor load, the memory usage, and the communication bus usage, and the ECU having the lowest total load may be selected as the target ECU. A method (function or the like) of calculating the total load can be appropriately designed by those skilled in the art. For example, a sum of the weighted processor load, memory usage, and communication bus usage which are obtained by multiplying a weight may be used as the total load. Such determination processing enables an appropriate target ECU to be selected.

The input delay table 1002 can be generated based on, for example, a communication time table 1003. The communication time table indicates a time required for communication processing via each communication bus for each data size. Alternatively, the input delay table 1002 may be created and stored in advance. Alternatively, the input delay table 1002 may be acquired in association with the update program.

Control design 1004 illustrates an overview of input and output of the client application. A recognition program generates a camera image, the camera image is input to the client application, the client application generates output information based on the camera image, and the output information is input to an operation program and a display program.

An output determination example 1005 indicates an achievement status of the output delay constraint (in step 801, measured by the management means DRIM) when the ECU 2 is set as the target ECU. In this example, both items of the control information A and B are output from the ECU 2 at a cycle of 50 ms. Since both the items of the control information have the cycles of within 50 ms, it is determined that the output delay constraint is satisfied.

Besides, an output determination example 1006 indicates a status of an output delay in the ECU 3 when the ECU 2 is set as the target ECU. In the ECU 3, the operation program is executed, the control information A is unnecessary, and the output cycle of the control information B is 100 ms.

Similarly, an output determination example 1007 indicates a status of an output delay in the ECU 5 when the ECU 2 is set as the target ECU. In the ECU 3, the display program is executed, the output cycle of the control information A is 10.2 s, and the control information A is unnecessary.

Figure 11:
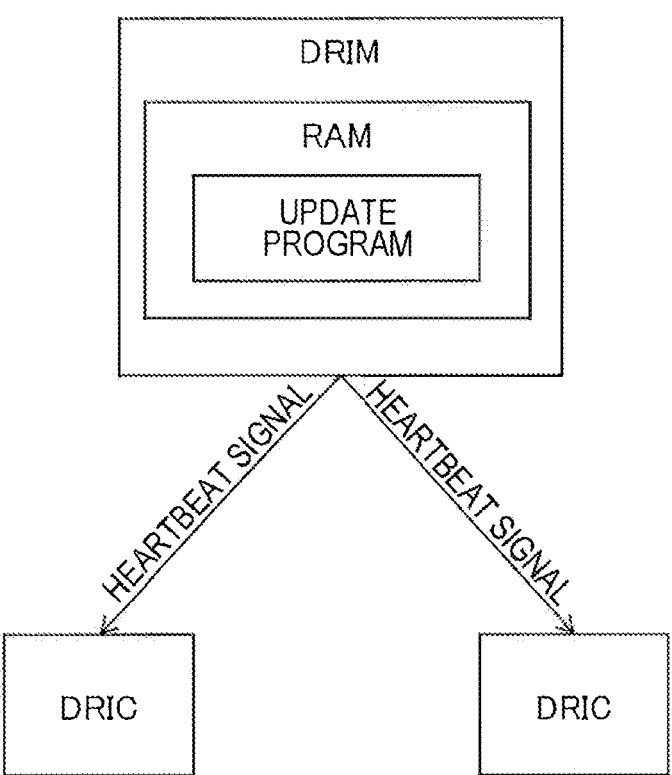

FIG. 11 illustrates an example of a relationship between the management means DRIM and the execution means DRIC in Example 1. The management means DRIM stores the update program in a random access memory (RAM). In addition, the management means DRIM transmits a heartbeat signal to each execution means DRIC (more specifically, each ECU that realizes each execution means DRIC) in a predetermined cycle.

Each execution means DRIC detects a failure of the management means DRIM based on the absence of the heartbeat signal. Here, "absence of a heartbeat signal" means that, for example, a heartbeat signal is not received at a predetermined timing, or a time from reception of a certain heartbeat signal to reception of a next heartbeat signal exceeds a predetermined threshold.

When the failure of the management means DRIM is detected, each execution means DRIC ignores a signal received from the management means DRIM after the detection. In addition, each execution means DRIC transmits failure information to one other execution means DRIC when detecting a failure of the management means DRIM. When the failure information is received, each execution means DRIC ignores the signal received from the management means DRIM after the reception. In this way, when a failure occurs in the management means DRIM, malfunction of the in-vehicle computer system due to erroneous control information transmitted thereafter is suppressed.

Besides, in the example of FIG. 10, the output delay constraint indicates an output cycle, but an allowable delay may be indicated as a modification example. For example, in the example of FIG. 10, the output delay constraint may be that data having a size of 10 bytes must be output from the client application within 50 ms for each of the two types of items of control information (control information A and B).

As described above, according to the in-vehicle computer system according to Example 1 and the autonomous driving assistance system including the same, a new function can be added by updating the program of the in-vehicle computer system.

The description provided above is an example, and those skilled in the art can make appropriate variations without departing from the scope of the accompanying claims.

REFERENCE SIGNS LIST

101 environment recognition sensor system
102 environment recognition system 103 planning system
104 wireless communication system
105 physical network communication system
106 action system
107 vehicle body/chassis control system
108 infotainment system
109 human-machine interface system
110 driver monitoring system
111 vehicle control system
112 V2X system
113 driver intention
114 malfunction monitoring system
115 powertrain system
201, 208 roadside device (computer outside vehicle)
202, 204, 205, 209 vehicle
203, 206 smart infrastructure (computer outside vehicle)
207 cloud server (computer outside vehicle)
211 road surface (computer outside vehicle)
212 satellite (computer outside vehicle)
301 roadside device (computer outside vehicle)
302, 303 smart infrastructure (computer outside vehicle)
304 road surface (computer outside vehicle)
305 cloud server (computer outside vehicle)
306 satellite (computer outside vehicle)
307 to 309 vehicle
310 application integrator
401 standard L1
402 standard L2
403 to 408 sensor
409 abbreviation
601 cloud server
602 vehicle
603 roadside device
604 in-vehicle computer system
605 on-board device
606 environment sensor
607 vehicle sensor
608 AD/ADAS application
609 monitoring means
610 powertrain application
611 vehicle body control application
612 chassis control application
613 actuator
614 infotainment means
615 map means
701 to 705 ECU
706 to 710 communication bus
901, 903, 904, 909, 911 ECU
905 to 908, 910 communication bus
1001 input/output constraint (input delay constraint and output delay constraint)
1002 input delay table
1003 communication time table
1004 control design
1005 to 1007 output determination example DRIC execution means DRIM management means VASEM estimation means VLASE measurement means All publications, patents, and patent applications cited herein are hereby incorporated by reference in entirety.

The invention claimed is:

1. An in-vehicle computer system that is able to communicate with a computer outside a vehicle, and has a plurality of electronic control units (ECUs), each of the ECUs being able to communicate with at least one other ECU via a communication bus, the in-vehicle computer system comprising:

measurement means that measures an ECU state for the ECUs, the ECU state including information indicating a program being executed in the ECU, and including a processor load, a memory usage, and a communication bus usage in the ECU;

estimation means that estimates a vehicle state based on the ECU state and a connection configuration of the communication bus; and management means that acquires an update program and execution conditions of the update program, the execution conditions including an input delay constraint and an output delay constraint of the update program, wherein the management means dynamically selects, at runtime, a first ECU that is to execute the update program based on (i) the ECU state measured by the measurement means, (ii) the vehicle state estimated by the estimation means, and (iii) the execution conditions including the input delay constraint and the output delay constraint, and based on a communication-bus connection configuration including a communication-bus latency between ECUs, wherein the management means determines whether or not a time required for starting execution of the update program and terminating execution of the redundancy program satisfies a predetermined safety criterion that changes depending on a vehicle speed, the first ECU executes the update program, wherein the redundancy program is a program redundant for the update program, and the management means terminates execution of the redundancy program by transmitting a termination request to an ECU executing the redundancy program, the management means determines whether or not an output delay constraint of the update program is satisfied, and the management means terminates execution of a redundancy program redundant to the update program.

2. The in-vehicle computer system according to claim 1, wherein, when the ECUs detect a failure in the management means, the ECUs execute the redundancy program whose execution has been terminated by the management means.

3. The in-vehicle computer system according to claim 1, wherein the management means stores the update program in a random access memory (RAM) and transmits a heartbeat signal to each of the ECUs, each of the ECUs performs detection of a failure in the management means based on a lack of the heartbeat signal, each of the ECUs ignores a signal received from the management means after the detection when the failure is detected, each of the ECUs transmits failure information to the other ECUs when the failure is detected, and each of the ECUs ignores a signal received from the management means after reception of the failure information when the failure information is received.

4. The in-vehicle computer system according to claim 1, wherein the in-vehicle computer system executes predetermined safety processing when the output delay constraint of the update program is not satisfied.

5. An autonomous driving assistance system comprising: the in-vehicle computer system according to claim 1; and a computer outside the vehicle.

* * * * *